April 21, 1959   R. A. MEYER   2,882,575
WING ENVELOPE HOLDER ASSEMBLY FOR PASS CASE
Filed Aug. 9, 1956   2 Sheets-Sheet 1

INVENTOR
ROBERT A. MEYER
By John W. Michael
ATTORNEY

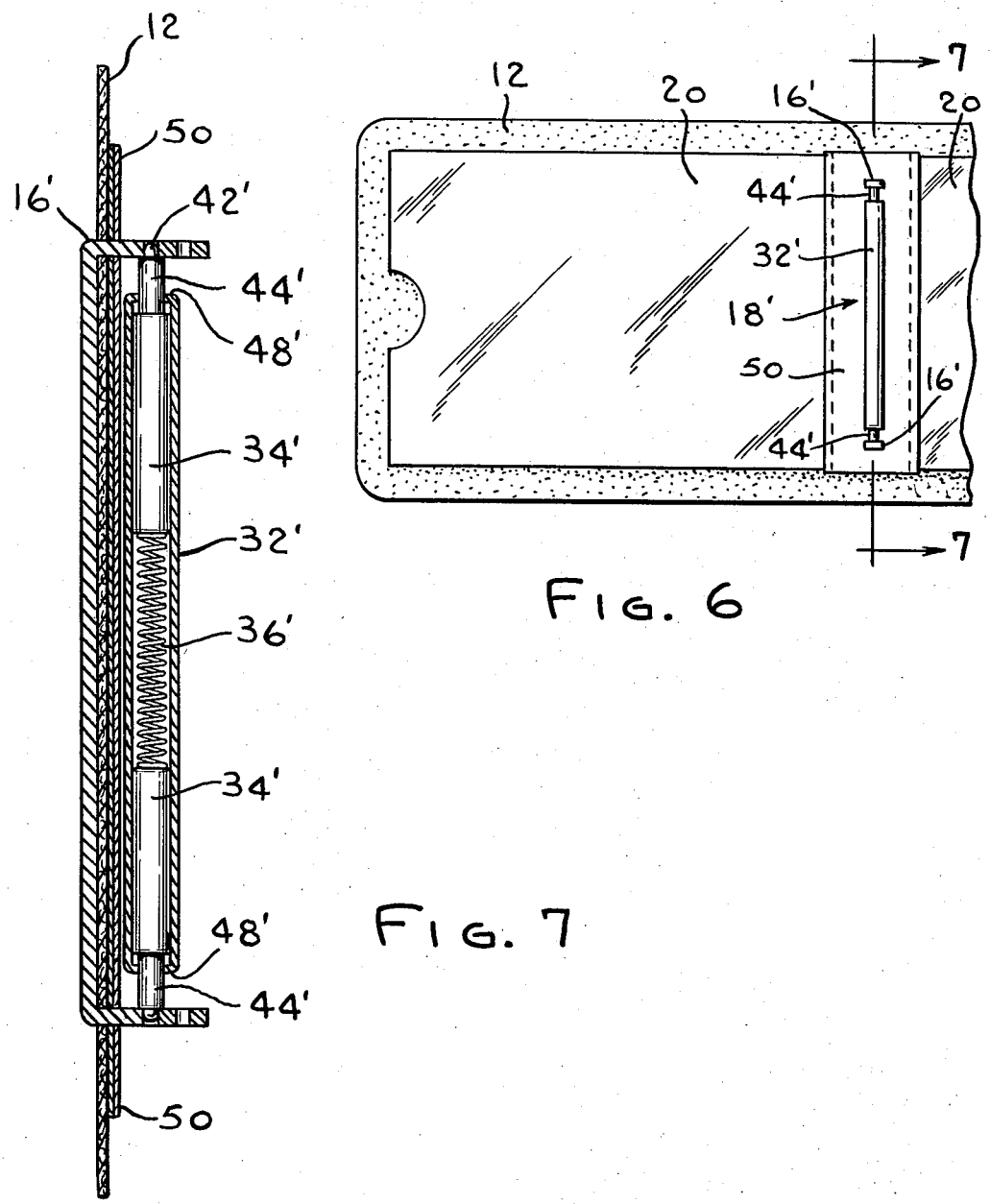

United States Patent Office 2,882,575
Patented Apr. 21, 1959

2,882,575
WING ENVELOPE HOLDER ASSEMBLY FOR PASS CASE

Robert A. Meyer, West Bend, Wis., assignor to Amity Leather Products Co., West Bend, Wis., a corporation of Wisconsin Application August 9, 1956, Serial No. 603,016

1 Claim. (Cl. 24—153)

This invention relates to an improved holder assembly for securing wing envelopes in an ordinary pass case. The holder assembly which is the subject of this invention has many other useful applications, as, for example, to hold the pages in a loose-leaf folder, but for purposes of explanation and description only one application is shown.

It is an object of this invention to provide an assembly whereby the wing envelopes can be easily and rapidly removed from and inserted securely in an ordinary pass case.

Another object of this invention is to provide an assembly which is adjustable to accommodate a varying number of wing envelopes.

Another object of this invention is to provide an assembly which is durable and inexpensive to manufacture.

These objects are attained by an assembly consisting of two basic parts, a bracket with an apertured flange at each end and a spring loaded axially expandable pin. The apertured flanges at the ends of the bracket are disposed at an angle of approximately 90 degrees with the base of the bracket. The apertures therein are adapted to accommodate the pin at various distances from the base of the bracket with the axis of the pin at all times remaining parallel to said base.

The pin in one embodiment is made from a hollow cylindrical section open at one end with a rod slidably mounted therein. An ordinary coil-type compression spring is positioned in the cylindrical section between the closed end of said section and one end of the rod, so as to bias the rod axially out of the cylindrical section. Means to limit the axial movement of the rod out of the cylindrical section is provided to cause a constant pressure to be exerted on the end of the rod by the spring even when the pin is in its fully extended position. The closed end of the cylindrical section and the exposed end of the rod are reduced in diameter to form tips to cooperate with the apertures in the flanges of the bracket. The over-all length of the pin in its fully extended position is slightly greater than the distance between the flanges on the bracket. To fit the pin between the flanges, it is necessary to compress the pin against the pressure of the spring, causing the pin to assume a snug and secure position when placed between said flanges.

In the single modification of the pin shown, the cylindrical section is open at both ends with rods mounted therein. A coil-type compression spring is mounted in the cylindrical section between the ends of the rods to bias the rod axially out of the cylindrical section. Means to limit the axial movement of the rods out of the cylindrical section is provided resulting in a pin with characteristic similar to the embodiment previously described.

The holder assembly described above has many useful applications. In the drawings and detailed description that follows, it is shown as a means for securing transparent wing envelopes in an ordinary pass case. The pass case cover and the wing envelopes are adapted to fit over the bracket with the flanges thereof extending through spaced openings in the cover and envelopes. The pin is then fitted between the flanges to hold all the parts securely in place. A single modification of this embodiment is shown in which the flanges of the bracket do not extend through the wing envelopes but are spaced to pass immediately adjacent the edges of the envelopes.

This invention makes the insertion and removal of wing envelopes to and from a pass case a very simple and rapid operation. The pin can be removed from or inserted between the flanges of the bracket by merely pushing the rod into the cylindrical section against the pressure of the spring. There is nothing to bend or fold and the operation can be repeated indefinitely without failures due to stress fatigue of any of the component parts. The position of the pin with respect to the base of the bracket is adjustable to vary the distance between the pin and the bracket base. Therefore, the holding assembly can accommodate wing envelopes which will vary in number over a wide range.

Other objects and advantages will be apparent from the detailed description that follows of the two embodiments shown in the drawings, in which:

Fig. 6 is a view of a pass case embodying a modification of the invention; and

Fig. 7 is an enlarged sectional view taken along line 7—7 of Fig. 6.

Figure 1:
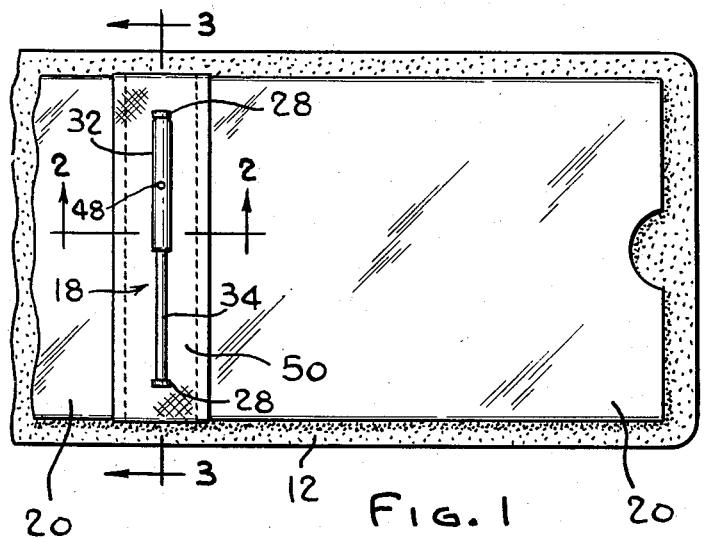
Fig. 1 is a view of a pass case embodying the invention.

Referring to the drawings, the pass case 10 consists of a cover 12, a bracket 16, a pin 18, and transparent wing envelopes 20.

The bracket 16 consists of a base 26 and two flanges 28, 28 which are disposed at substantially 90 degrees to the base 26, and are provided with matching apertures 30 to receive the tips 40 and 42 of the pin 18.

The pin 18 consists of a hollow cylindrical section 32, a rod 34 and a spring 36. The cylindrical section 32 is closed at one end 38 to form a seat for the spring 36 and it is also reduced in diameter to form a tip 40.

The rod 34 has one end reduced in diameter to form a tip 42, similar to tip 40 on cylindrical secton 32. A portion of the other end of rod 34 is reduced in diameter at 44 to form a head 46 at the end of the rod 34.

Figure 3:
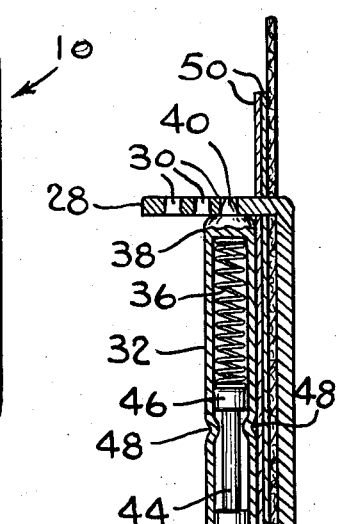
Fig. 3 is an enlarged sectional view taken along the line 3—3 of Fig. 1.
Figure 2:
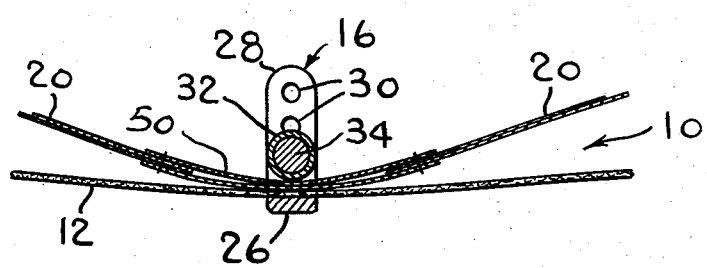
Fig. 2 is an enlarged sectional view taken along the line 2—2 of Fig. 1.

The pin 18 is assembled as shown in Fig. 3. The spring 36 and rod 34 are inserted in the cylindrical section 32 with one end of spring 36 bearing against end 38 of cylindrical section 32 and the other bearing against head 46 of rod 34 to bias the rod 34 outwardly from the cylindrical section 32. The axial movement of rod 34 in cylindrical section 32 is limited in one direction by indentations 48, 48 in the walls of said cylindrical section 32. The indentations 48, 48 reduce the cross-sectional area of cylindrical section 32 and prevent the movement of head 46 past the point of reduced area. The dimensions of the component parts of pin 18 and the position of indentations 48, 48 are such that when the pin 18 is at its fully extended position its overall length is slightly greater than the distance between flanges 28, 28 of bracket 16 and there will be a constant pressure exerted on head 46 of rod 34 by spring 36. To insert the pin 18 between flanges 28, 28 the rod 34 is pushed into cylindrical section 32 against the pressure of spring 36 until the overall length of the pin has been reduced sufficiently to allow tips 40, 42 of pin 18 to be inserted in apertures 30 of flanges 28, 28.

A modified pin 18' shown in Figs. 6 and 7 includes a hollow cylindrical section 32', rods 34', 34' and a spring 36'. The cylindrical section 32' is open at both ends. Rods 34', 34' are reduced in diameter as at 44', 44' and are provided with tips 42', 42'. The pin 18' is assembled as shown in Fig. 7. The spring 36' is inserted in cylindrical section 32' between rods 34', 34' to bias said rods outwardly from the cylindrical section 32'. The outward axial movement of rods 34', 34' is limited by crimped ends 48', 48' of the cylindrical section 32' so that pin 18' can be removed from and inserted in bracket 16' in the same manner as in the embodiment described above.

The cover 12 is made from a single piece of flexible material such as leather, plastic, or the like. The transparent wing envelopes 20 are joined in pairs by a connector strip 50, which is made of imitation leather, sturdy cloth, or similar material.

As shown in Figs. 1 and 6, the cover 12 and connector strip 50 have spaced openings which correspond with flanges 28, 28 of bracket 16 and through which said flanges extend.

Figure 5:
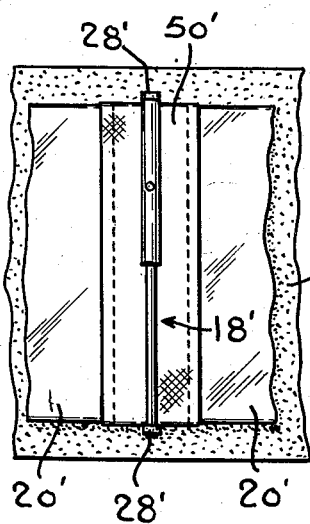
Fig. 5 is a fragmentary view similar to Fig. 1 but showing a modified form of the invention.
Figure 4:
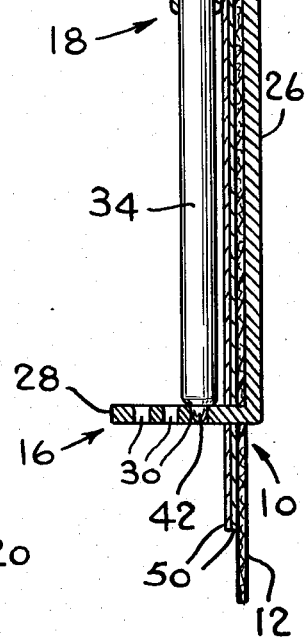
Fig. 4 is a view of the pass case in a folded position.

In the modification shown in Fig. 5, the cover 12' has spaced openings similar to those in cover 12 shown in Fig. 1, but the connector strip 50' of wing envelopes 20' has no openings. The flanges 28', 28' extend through the openings in cover 12' and extend on either side of connector strip 50' immediately adjacent the edges of said strip.

In both embodiments the pin 18 can be easily removed and inserted to permit the removal or addition of wing envelopes 20 by merely compressing the pin 18 with the fingers. The pin 18 will remain securely in place between flanges 28, 28 because of the continuous force of spring 36 acting to axially expand the ends of the pin. A snug fit between the pin, wing envelopes, cover and bracket is assured whether one or several wing envelopes are used by the provision made for adjusting the distance of pin 18 from the base 26 of bracket 16. This is accomplished as shown in Fig. 3 by a series of matched pairs of apertures 30 in the flanges 28, 28. Each pair of matched apertures 30 provides a different position for pin 18 in relationship to the base 26 of bracket 16.

From the foregoing description, taken together with the accompanying drawings, it will be readily apparent to those skilled in the art, that the holder assembly of this invention has the highly desirable advantages of being easily and rapidly manipulated, adjustable to accommodate one or several wing envelopes, of durable construction and inexpensive to manufacture.

I claim:

An improved holder assembly for securing wing envelopes to an ordinary pass case comprising: a bracket having an elongated base, flanges extending from said base at right angles thereto, each of said flanges having a plurality of spaced apertures, a pin extending between said flanges, said pin being provided with tips on the ends for selective engagement in pairs of said apertures, said pin comprising telescoping parts, and spring means engageable with said telescoping parts to releasably maintain said pin tips in a selected pair of said apertures.

References Cited in the file of this patent

UNITED STATES PATENTS

| | | |
|---|---|---|
| 220,675 | Smith et al. | Oct. 14, 1879 |
| 257,882 | McFarland | May 16, 1882 |
| 698,223 | Prideaux | Apr. 22, 1902 |
| 2,382,249 | Megor | Aug. 14, 1945 |
| 2,462,321 | Holmes | Feb. 2, 1949 |
| 2,522,439 | Feurer | Sept. 12, 1950 |
| 2,576,684 | Jaccarino et al. | Nov. 27, 1951 |
| 2,727,550 | Montessi | Dec. 20, 1955 |
| 2,750,642 | England | June 19, 1956 |
| 2,767,452 | Lombardi | Oct. 23, 1956 |
| 2,797,461 | Osher | July 2, 1957 |